United States Patent [19]

Maskalick

[11] 4,447,509
[45] May 8, 1984

[54] PRE-PLATED REACTIVE DIFFUSION-BONDED BATTERY ELECTRODE PLAQUES

[75] Inventor: Nicholas J. Maskalick, Pittsburgh, Pa.

[73] Assignee: The United States of America as represented by the United States Department of Energy, Washington, D.C.

[21] Appl. No.: 362,003

[22] Filed: Mar. 29, 1982

Related U.S. Application Data

[63] Continuation-in-part of Ser. No. 321,645, Nov. 16, 1981.

[51] Int. Cl.³ .............................................. H01M 4/75
[52] U.S. Cl. .................................. 429/235; 429/245; 29/623.5; 427/88
[58] Field of Search ............... 429/235, 245, 221, 211; 427/88; 29/623.5

[56] References Cited

U.S. PATENT DOCUMENTS

| | | | |
|---|---|---|---|
| 3,262,815 | 7/1966 | Langer et al. | 429/235 X |
| 3,266,936 | 8/1966 | Krebs | 429/235 |
| 3,679,482 | 7/1972 | Hardman | 429/235 |
| 3,835,514 | 9/1974 | Pollack | 429/235 X |
| 3,895,960 | 7/1975 | Brown et al. | 427/88 |

Primary Examiner—Anthony Skapars
Attorney, Agent, or Firm—D. P. Cillo

[57] ABSTRACT

A high strength, metallic fiber battery plaque is made using reactive diffusion bonding techniques, where a substantial amount of the fibers are bonded together by an iron-nickel alloy.

18 Claims, 4 Drawing Figures

PRE-PLATED REACTIVE DIFFUSION-BONDED BATTERY ELECTRODE PLAQUES

GOVERNMENT CONTRACT

This invention was made or conceived in the course of or under Contract No. W-31-109-38-4141, with the U.S. Government as represented by the Department of Energy.

CROSS-REFERENCE TO RELATED APPLICATIONS

The present application is a continuation-in-part application of application U.S. Ser. No. 321,645, filed on Nov. 16, 1981, now abandoned, and assigned to the assignee of this invention.

BACKGROUND OF THE INVENTION

This invention relates to high strength, corrosion resistant, flexible fiber plaques, suitable for use as active material loaded electrodes in battery systems, such as nickel-cadmium, and preferably, nickel-iron battery systems.

Various types of fibrous plaques for alkaline secondary batteries have been tried in the past. One type, taught by Krebs, in U.S. Pat. No. 3,266,936, contained large numbers of clefts and protuberances due to melt connection of fibers. Such a melt connection process, while providing a strong plaque having a large fiber surface area, decreased the plaque pore volume, and thus the potential active material content. The Krebs metal fiber melt globule structure was plated with a layer of nickel, either after 800° C. oxidation or after 850° C. reduction sintering.

Brown et al., in U.S. Patent 3,895,960, made fiber metal plaques by diffusion bonding rather than melting the metal fibers together. After diffusion bonding, a layer of nickel was plated onto the plaque. Brown et al. taught that plating only after final diffusion bonding was essential in order to insure low electrical resistivity of the coated fiber structure. Such a structure, while providing excellent plaque pore volume, lacked somewhat in strength properties. What is needed is a metal fiber plaque structure having both high pore volume and high strength characteristics, as well as even better corrosion resistance and acceptable resistivity values.

SUMMARY OF THE INVENTION

The above problems have been solved, unexpectedly, by nickel plating iron fibers prior to final diffusion bonding. More specifically, the invention comprises the steps of: (1) Providing sheets of intermingled, relatively smooth, essentially unoxidized, iron fibers, (2) Nickel coating the essentially unoxidized iron fibers, (3) Pressing the nickel plated fibers into physical contact with each other, and then, (4) In a non-oxidizing atmosphere, heating the fibers at about 800° C. to 1,300° C. for 5 minutes to several hours. In the above process, the term "iron fibers" is meant to include iron wool and steel wool fibers. Somewhere during the process a metal tab is attached by a suitable welding technique or by other means to the fibers. The plaque is then coated with a final strike of nickel plate.

As a result of nickel plating prior to final sintering or diffusion bonding the iron wool or steel wool fibers, two events occur after the process described above: (1) The fibers form an exceptionally well-interconnected, reactive diffusion bonded body, and (2) The nickel diffuses into the fibers, during step (4), to form an alloy of approximately 30% Ni and 70% Fe, through from about 5% to about 100% of the radius of the fiber. The resut is a fiber plaque having good electrical conductance, an approximate four-times increase in strength, and good corrosion resistance. Subsequent plating with a final flash coat of nickel provides an optimum structure for electrodes in the preferred nickel-iron storage cell.

BRIEF DESCRIPTION OF THE DRAWINGS

For a better understanding of the nature and objects of the invention, reference may be made to the drawings in which.

DESCRIPTION OF THE PREFERRED EMBODIMENTS

Figure 1:
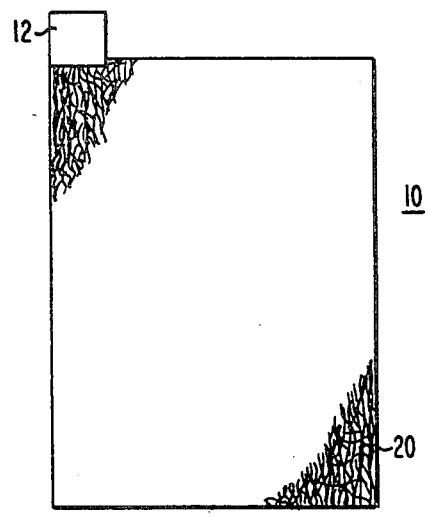
FIG. 1 shows one configuration of the unloaded plaque of this invention.
Figure 2:
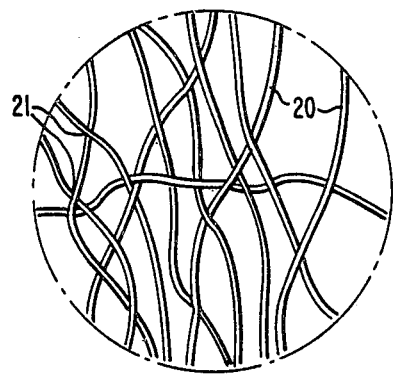
FIG. 2 shows a magnified view of the reactive diffusion bonded metallic fibers of the plaque.

Referring to FIG. 1 of the drawing, plaque 10 comprises at least one metallic fibrous sheet with an attached tab. The sheet is shown after diffusion bonding at great magnification in FIG. 2 and consists of compacted, intermingled, fine conductive fibers 20 such as iron wool fibers reactively diffused with nickel. The fibers, which may be produced by a wide variety of techniques and which may be randomly oriented in the length, width, and thickness directions, are diffusion bonded at their contact points to form a substantial amount of critically proportioned iron-nickel alloy diffusion bonds at a multiplicity of crossover points 21 in each sheet, and between fibers of adjacent sheets in the plaque.

Figure 3:
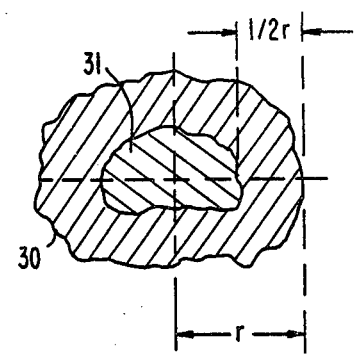
FIG. 3 shows a cross-sectional view of a fiber, after nickel coating and then reactive diffusing, where about 50% of the iron core remains underneath an Fe-Ni outer layer.

Reactive diffusing of nickel atoms from the nickel plating into the iron fibers in this way produces interaction between the two metals, and an alloy of the genre known as "valve metal," which consists of about 60% to 80% iron and about 20% to 40% nickel. The valve metal composition may vary around this general region, depending on the relative amounts of iron fiber vs. nickel plating thickness involved, and on the time and temperature employed during the reactive diffusion treatment. As can be seen from FIG. 3, showing a fiber cross-section, the iron-nickel alloy 30 forms a surface layer over the remaining, unreacted base iron core 31. At least 5% of the length of the radius r of a substantial amount of the fibers must consist of iron-nickel alloy 30. In some instances it may be advantageous to have 100% of the fiber consist of iron-nickel alloy, i.e., react all the iron. Preferably, from 25% to 100% of r will consist of alloy. FIG. 3 shows a 50% alloy layer, i.e., ½ r as produced in Example 1. As can be seen, the iron fibers can have an irregular cross-section. The term "radius" is herein meant to include ½ the cross-sectional length or width of the fiber, whether the fiber cross-section is generally circular, rectangular or otherwise. The term "iron fibers" as used throughout is defined as including steel wool fibers.

In the diffusion bonding process of this invention, the fibers must not be melted together, there must be an interdiffusion of nickel and iron atoms across the fiber interface. It should be apparent from FIG. 2 and the description herein, that the fibers are relatively smooth and even and are essentially free of clefts and protuberances. Also, the plaque consists only of metal fibers into which active material is directly intruded. There are no metal powder particles nor a metal sponge structure. The flexible fibrous plaques 10 shown in FIG. 1 may have a conductive metal lead tab 12, which may have a variety of shapes, attached. Active electrode material will be disposed in the interstices of the body of the fibrous plaque.

While fine, commercially available steel wool is found to be an unusually suitable and economical material for the electrode plaque construction of this invention, and the description hereafter relates directly thereto, it is to be understood that other types of fibers, strands or filaments can also be used, and that the term "fibers" is used herein to include all such elongated material. The steel wool should be first degreased in a suitable solvent such as trichloroethylene and dried or, if oxidized, heated at about 800° C. to 1,200° C. in a non-oxidizing, reducing atmosphere such as hydrogen or cracked ammonia to degrease and also deoxidize the fibers without melting them. In this deoxidation step, a suitable heat resistant substrate is placed underneath and on top of the steel wool sheet. A certain amount of iron fiber to iron fiber diffusion bonding will take place during this step, but a great portion of the iron fibers will not contact each other so that subsequent nickel plating will provide a substantial amount of alloy connections during final diffusion bonding.

Especially suitable steel wool is grade 1/0 steel wool, which is available in the form of a long sheet of intermingled, randomally oriented fibers. These intermingled fibers are relatively smooth and may exceed 1 inch in length. Excellent results have been had with steel wool fibers about 1 inch long having a diameter ranging from about 0.0002 inch to 0.014 inch and a carbon content of about 0.08%. The average diameter of the 1/0 grade of steel wool fibers is 0.001 inch. It is to be understood that the term "diameter" includes irregular geometric cross-sections. The steel wool is basically a low carbon steel, but the plaque may comprise pure iron or nearly pure iron. Usually, the steel wool is an alloy of no more than about 1% carbon. The iron fibers used can contain up to about 1% carbon.

The steel wool (iron fibers) are coated by electrolytic or electrodeless means, with one or more essentially continuous, thin layers, about 0.000003 to about 0.002 inch thick of nickel, depending on fiber diameter, prior to final diffusion bonding. Excessive nickel coating will produce an alloy generally having over about 40% nickel, which will provide a ductile, low strength alloy. The ratio of average iron fiber diameter: average nickel coating thickness over the iron fiber prior to diffusion and bonding will range from about 1:0.02 to 0.25. Use of this ratio during the diffusion bonding will provide the proper "valve" metal alloy. After final diffusion bonding, an additional strike coating of nickel, about 0.000003 to about 0.002 inch thick, must be applied to the plaque so that subsequently applied battery active material does not contact any alloy. While the final nickel strike assures corrosion resistance, the use of a substantial amount of alloy bonding earlier in the process increases corrosion resistance allowing use of thinner final nickel strike application.

After initially plating the iron wool, the fibers of each sheet as well as fibers of the adjacent sheets are pressed to insure physical contact and diffusion bonding together so as to produce plaques having a uniform density. The fibers must not be melted together or the pore volume of the plaque will be full of alloy globules. Practically, the diffusion bonding temperature will range from about 800° C. to about 1,300° C. The atmosphere used during diffusion bonding to prevent oxidation of the fibers should be non-oxidizing, inert or reducing, as for example, argon, hydrogen, nitrogen, helium and dissociated ammonia. The density of the plaque for good results (maximum loading of active material and good electrical conductance) must be between 5 to 25 percent of theoretical density (i.e., 75 to 95 percent porosity).

Various methods and pressing means can be used to achieve this density. After initial deoxidation, with resultant minor diffusion bonding, the plaque may be nickel plated and then sized by pressing to the desired thickness followed by final diffusion bonding and flash nickel plating; or after initial deoxidation, the plaque may be sized by pressing to the desired thickness, diffusion bonded to form a substantial amount of iron to iron bonds while still providing a substantial amount of unbonded fibers capable of subsequently being plated between to form an alloy, nickel plated to coat both the bonded and the substantial portion of unbonded fibers, and then final diffusion bonded and flash nickel plated. The critical step is to nickel plate before final diffusion bonding so that a substantial amount of alloy is formed between fibers; and this can be accomplished even though there is prior sizing and intermediate diffusion bonding. During the final diffusion bonding step a weight or the like can be placed on the sheets causing them to assume a more compact form, so that, at that point after nickel coating, almost all fibers contact. Also, after bonding, a plaque can be pressed to the desired thickness to give the desired density. An electrically conducting metal tab current collector of, for example, nickel, is attached by mechanical means, brazing, soldering, welding, diffusion bonding or the like, somewhere in the process, prior to or after the final reactive diffusion bonding, or after final nickel plating. Preferably the tab is connected after final diffusion bonding and before the nickel strike.

Suitable active electrode materials are nickel hydroxide and various iron oxides. Certain metal compound additives such as cobalt hydroxide may also be incorporated in the active electrode material to improve electrode functioning. The plaques can be loaded with active material by any suitable method such as, for example, pasting, pouring an aqueous slurry of active material over the plaque and then applying a slight vacuum, or by electroprecipitation techniques well known in the art.

Figure 4:
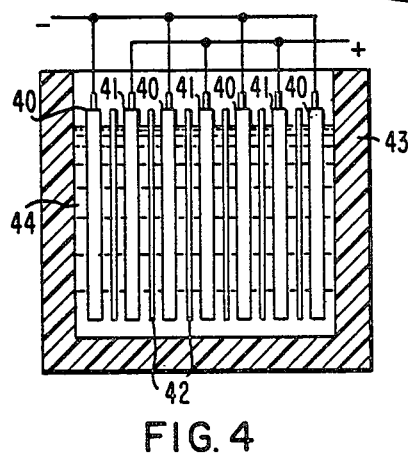
FIG. 4 shows a nickel-iron battery utilizing loaded plaques of this invention.

In further accord with this invention, the battery of FIG. 4 is shown. It consists of a plurality of active material loaded negative electrode plaques 40 and active material loaded positive electrode plaques 41 with separators 42 therebetween, encased in a suitable container 43. Electrolyte 44 can then be introduced, and through the electrical connections provided on the battery, the loaded plaques can be cycled through charging and discharging periods.

EXAMPLE I

Four, 6.5 inch × 8.9 inch layup sheets of 1/0 grade iron (steel) wool (intermingled fibers about 1 inch long and 0.001 inch in diameter with a carbon content of 0.08%) were degreased and deoxidized in a hydrogen reduction furnace at 1,000° C., with a resultant minor amount of diffusion bonding. The total weight of the sheets was about 100 grams and the flat planar surface area of each sheet was 58 square inches. The sheets were uniformly nickel plated with 15 grams of nickel (about 0.0001 inch thick) in a standard nickel sulfamate plating bath. The ratio of fiber diameter:nickel coating was 1:0.1. The sheets were pressed, at about 2 pounds per square inch of metallic sheet by applying a weight to bring the fibers in contact with each other.

Then the fibers and sheets were reactively diffusion bonded together in a hydrogen atmosphere at 1,000° C. for 20 minutes. A "valve" metal alloy layer consisting of about 70% iron and 30% nickel was formed on the fibers and at the crossover interconnection points of the nickel coated fibers, as shown by light optical microscopy. The iron-nickel alloy outer layer extended inward to about ½ the radius of the particles, as shown in FIG. 3 of the drawings.

The fibers were not melted during this process. To prevent sticking of the plaque to the weight during reactive diffusion bonding, a heavy gauge steel screen was used between the steel wool and the weight. The resulting diffusion bonded plaque was allowed to compact to 0.125 inch in thickness. This gave a plaque about 10 percent dense (90 percent porous). A pure steel strip was spot welded to the plaque to act as the electrical tab lead. The plaque was cut to size (6.5 inches × 8.9 inches) and given a final uniform nickel plate (about 0.00003 inch thick).

A comparative plaque was made in the same way as described above, except that it was not nickel plated before the final diffusion bonding. Tests were then run to determine the strength, resistivity and corrosion resistance of each plaque as shown in Table 1 below:

TABLE 1

| | | Porosity | Strength | Resistivity | Fe Corrosion* |
|---|---|---|---|---|---|
| (A) | Plaque nickel plated before final bonding | 90% | 3,500 ± 670 psi. | 300 μΩ-cm | 0.4 Fe mg./liter |
| (B) | Plaque not nickel plated before final bonding** | 90% | 800 ± 60 psi. | 100 to 200 μΩ-cm | 0.4 Fe mg./liter |

**comparative plaque
*16 hours in de-ionized water
Strength was measured by attaching ends of the plaque in a vise and applying a known tensile strength until rupture.

As can be seen, resistivity increased by a factor of about 2X, much less than expected and well within acceptable limits. As compensation, plaque strength unexpectedly increased by a factor of about 4X. Both plaques exhibited outstanding corrosion resistance. The added strength of the plaque of this invention is achieved through the enhanced inter-fiber bonding which arises from the activation energy provided by Ni-Fe alloy formation. The new alloy formed also, of itself, provides more strength as well. As the electrical resistance and corrosion tests show, the fiber body, initially plated before the final diffusion bonding step, particularly when subsequently replated, is appropriate for use as an electrode in a battery such as a nickel-iron battery.

A plaque made the same as plaque (A), nickel plated before final diffusion bonding, was loaded with nickel hydroxide active battery material using electroprecipitation techniques to provide a positive electrode plate. This plate was disposed between two iron electrode plates in KOH solution to provide an electrical cell. The cell was tested for electrical properties and was found to be capable of over 780 complete 5 hour charge-discharge cycles in which 100% of the plate capacity was discharged each cycle at 8.3 amperes constant current. Cell capacity decreased only 19% during this period, from 21.6 amp/hr. to 17.5 amp/hr., indicating superior electrical properties of the positive plaque structure.

I claim:

1. A method of producing a high strength, metallic, electrically conductive plaque comprising the steps of:
   (1) providing a layer of iron fibers,
   (2) nickel coating said iron fibers, and
   (3) after nickel coating, heating the nickel coated iron fibers to form an iron-nickel alloy bond between a substantial amount of the fibers.

2. The method of claim 1, where the fibers are heated at a temperature of about 800° C. to about 1,300° C. in step (3).

3. The method of claim 1, where physical contact is established between the nickel coated fibers after coating and is maintained during the heating step, an additional nickel coating is applied to the fibers after the heating step, the iron-nickel alloy is unmelted and consists essentially of about 60% to 80% iron and about 20% to 40% nickel, the thickness ratio of fiber diameter:nickel coating of step (2) is from about 1:0.02 to 0.25, and the thickness of the outer layer of iron-nickel alloy on the fibers after step (3) is at least 5% of the radius of the fibers.

4. The method of claim 1, where the fibers are heated at a temperature of about 800° C. to 1,300° C. in step (3), an additional nickel coating is applied to the fibers after the heating step, and the fibers are steel fibers.

5. A method of producing a high strength, metallic, electrically conductive battery plaque comprising the steps of:
   (1) providing a sheet of iron fibers,
   (2) deoxidizing said fibers in a non-oxidizing atmosphere,
   (3) nickel coating said fibers, and then
   (4) establishing physical contact between said nickel coated fibers, and then
   (5) maintaining said physical contact between said nickel coated fibers and diffusion bond heating the sheet of nickel coated fibers in a non-oxidizing atmosphere to form an outer layer of iron-nickel alloy on the fibers and to form a diffusion bond of iron-nickel alloy between a substantial amount of the fibers at points of physical contact, to form an electrically conductive plaque of iron-nickel alloy bonded fibers.

6. The method of claim 5, wherein the sheet is heated at a temperature of about 800° C. to about 1,300° C. in step (5), as a last step, an additional nickel strike about 0.000003 inch to about 0.002 inch thick is applied to the fibers, and the fibers are steel fibers.

7. The method of claim 5, wherein the deoxidation in step (2) requires heating at a temperature of about 800° C. to 1,200° C., and between steps (2) and (3), physical contact is established between the uncoated fibers and they are intermediate diffusion bonded in a non-oxidizing atmosphere to form a substantial amount of iron to iron bonding.

8. The method of claim 5, wherein a plurality of nickel plated sheets are provided, the sheets are stacked together and a pressure is imposed upon the stack so that fibers of one sheet are in physical contact with fibers of another sheet and the stack is heated to form said diffusion bonds between fibers.

9. The method of claim 5, wherein the fibers are relatively smooth, free of clefts and protuberances, have a diameter of from about 0.0002 inch to about 0.014 inch and a carbon content of up to about 1%, the electrode plaque is 75 to 95 percent porous, and the nickel coating deposited over the fibers in step (3) has a thickness of from about 0.000003 inch to about 0.002 inch.

10. The method of claim 5, wherein the iron-nickel alloy is unmelted and consists essentially of about 60% to 80% iron and about 20% and 40% nickel, the thickness ratio of fiber diameter:nickel coating of step (3) is from about 1:0.02 to 0.25, and the thickness of the outer layer of iron-nickel alloy on the fibers after step (5) is at least 5% of the radius of the fiber.

11. The method of claim 5, where the thickness of the outer layer of iron-nickel alloy on the fibers after step (5) is from 25% to 100% of the radius of the fiber.

12. The method of claim 5, wherein an electrically conducting metal tab current collector is attached to the plaque.

13. A plaque made by the method of claim 5, including an additional nickel coating applied to the fibers after the heating step, where the plaque is loaded with active battery material.

14. A high strength, electrically conductive battery electrode plaque comprising at least one sheet of contacting iron fibers, a substantial amount of said fibers having iron-nickel alloy bonding the fibers together at fiber contact points, where the iron-nickel alloy consists essentially of about 60% to 80% iron and about 20% to 40% nickel.

15. The battery plaque of claim 14, wherein the plaque is 75 to 95 percent porous, and the fibers are steel fibers having a diameter of from about 0.0002 inch to about 0.014 inch.

16. The battery plaque of claim 14, where the fibers have a carbon content of up to about 1%, the plaque has an outer nickel coating thereon, and the thickness of the iron-nickel alloy on the fibers is at least 5% of the radius of the fibers.

17. The battery plaque of claim 14, where the fibers are randomly oriented, the plaque has an additional nickel coating applied to the bonded fibers, and the electrode is loaded with active battery material and placed in a battery.

18. A plaque made by the method of claim 1, including an additional nickel coating applied to the fibers after the heating step, where the plaque is loaded with active material.

* * * * *